J. HAGER.
Stove-Pipe Dampers.
No. 154,039. Patented Aug. 11, 1874.
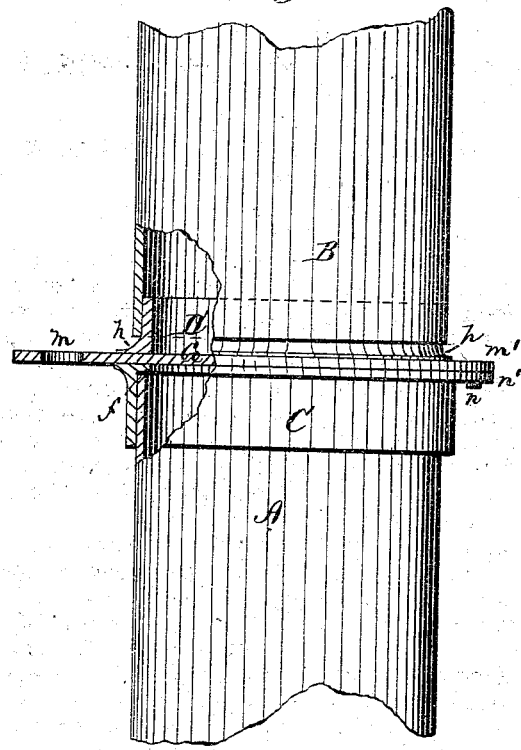
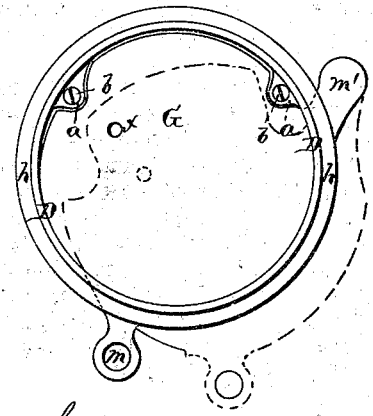
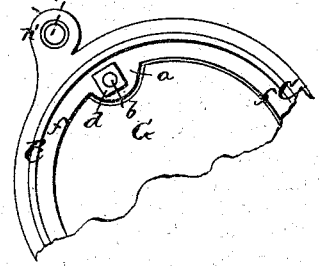
WITNESSES.
Franck L. Durand
C. L. Evert
INVENTOR
Jacob Hager,
By Alexander Mator
Attorneys.

UNITED STATES PATENT OFFICE.

JACOB HAGER, OF MOLINE, ILLINOIS.

IMPROVEMENT IN STOVE-PIPE DAMPERS.

Specification forming part of Letters Patent No. 154,039, dated August 11, 1874; application filed April 25, 1874.

*To all whom it may concern:*

Be it known that I, JACOB HAGER, of Moline, in the county of Rock Island and in the State of Illinois, have invented certain new and useful Improvements in Stove-Pipe Dampers; and do hereby declare that the following is a full, clear, and exact description thereof, reference being had to the accompanying drawings, and to the letters of reference marked thereon, making a part of this specification.

The nature of my invention consists in the construction and arrangement of a stove-pipe damper to be applied at the joint of two sections of stove-pipe, forming also a coupling for said sections, as will be hereinafter more fully set forth.

In order to enable others skilled in the art to which my invention appertains to make and use the same, I will now proceed to describe its construction and operation, referring to the annexed drawing, in which—

Figure 1 is a side elevation, part in section, of two sections of stove-pipe with my damper placed between them. Figs. 2 and 3 are detailed views of the damper.

A and B represent two sections of stove-pipe united together by means of my damper-case. The damper-case is made in two sections, in the form of two collars, C and D, of slightly unequal diameter, provided on their interior with ears $a\ a$, united by bolts $b\ b$ and nuts $d\ d$. The lower larger collar C has an interior circumferential shoulder, $f$, at the upper end. The upper end of the lower stove-pipe section A is inserted in the collar C, or rather the collar is placed on the stove-pipe sections till it rests on the shoulder $f$. The upper smaller collar D has an exterior circumferential shoulder, $h$, at the lower end, and this collar fits in the lower end of the stove-pipe section B till this section rests on the shoulder $h$. At the joint of the two collars C D they are constructed so as to form a slot for one-half the circumference for the passage of the damper G, which is constructed to fit around the inside of the coupling C D at the joint, and it is provided with two ears, $m\ m'$. The ear $m$ forms the handle of the damper, and the ear $m'$ has a pin, $n$, on its under side, which enters a hole in an ear, $n'$, on the collar C, and forms the pivot upon which the damper turns.

It will be noticed that the exterior flange on the upper collar is flaring, and hence the pipe-section B must bind. In the damper G is a hole, $x$; or a part of the damper may be cut out, so as to allow the egress of gas even when the damper is closed. The damper can be regulated as desired, and it cannot be moved by the current or passage of air, however strong the draft.

I am aware that a stove-pipe damper composed of two circular castings, the lower one of which has an extended horizontal shelf, upon which moves a sliding damper, is not new.

Having thus fully described my invention, what I claim as new, and desire to secure by Letters Patent, is—

The combination of the two collars C and D, with shoulders $f$ and $h$, and the damper G, provided with an ear, $m'$, which is pivoted to the ear $n'$ on the collar C, and swings horizontally in a space between the castings, substantially as and for the purposes set forth.

In testimony that I claim the foregoing I have hereunto set my hand this 9th day of March, 1874.

JACOB HAGER.

Witnesses:
CHARLES SUNDBERG,
E. L. LOBDELL.